[11] 3,578,842

[72] Inventors Richard J.
Zoltan G. S⎯⎯⎯
Timothy J. Kilduff, Greenbelt, Md.
[21] Appl. No. 766,383
[22] Filed Oct. 8, 1968
[45] Patented May 18, 1971
[73] Assignee the United States of America as represented by the Secretary of the Army

[54] EXPLODING MIRROR FOR OPTICAL VIEWING SYSTEM
4 Claims, 4 Drawing Figs.
[52] U.S. Cl...................................... 350/160, 350/288
[51] Int. Cl....................................... G02b 5/08
[50] Field of Search............................ 350/160, 288

Cited
PATENTS
3,152,215 10/1964 Barstow et al. ................ 350/160
3,213,752 10/1965 Ruderman..................... 350/160X
3,414,838 12/1968 DeMent ....................... 350/288(UX)

*Primary Examiner*—Rodney D. Bennett, Jr.
*Assistant Examiner*—Daniel C. Kaufman
*Attorneys*—Harry M. Saragovitz, Edward J. Kelly, Herbert Berl and J. D. Edgerton ABSTRACT: An exploding mirror for an optical viewing system which will partially self-destruct when a laser beam of a minimum predetermined energy density impinges thereon. Using an epoxy encapsulation method, an explosive charge is placed adjacent a thin film mirror on a glass slide. The opposite side of the mirror is part of the optical sight path of the viewing system. A laser beam of sufficient energy density will cause the explosive charge to detonate, thus blowing out a critical section of the mirror and disrupting the optical sight path, thereby protecting the viewer.

PATENTED MAY 18 1971   3,578,842

INVENTORS
RICHARD J. HOLLAND
TIMOTHY J. KILDUFF
ZOLTAN G. SZTANKAY

BY Harry M. Saragovitz, Edward J. Kelly,
Herbert Berl and J. D. Edgerton.
ATTORNEYS

EXPLODING MIRROR FOR OPTICAL VIEWING SYSTEM

RIGHTS OF THE GOVERNMENT

The invention described herein may be manufactured, used, and licensed by or for the United States Government for governmental purposes without the payment to us of any royalty thereon.

BACKGROUND OF THE INVENTION

Devices using lasers have recently been developed for communications and other military purposes, such as range finders. With the use of laser devices, there is a need for effective protection of personnel against the harmful effects that excessive laser energy can have on their vision. This can occur when personnel using sighting devices, such as periscopes, may inadvertently intercept a laser beam originating from friendly or enemy sources.

An optical viewing system for protection against laser beams is disclosed in U.S. Pat. application, Ser. No. 457,545, filed May 20, 1965 by Hans W. Kohler et al., and assigned to the assignee of the instant application. The system of the aforementioned application splits the incoming light into two beams, the "see beam" and the "burn beam." The "see beam" is delayed before reaching the exploding mirror where it would be reflected from its mirror side. The "burn beam" is immediately incident on the exploding mirror on its explosive side. When a laser beam of sufficient energy density is received by the system, the "burn beam" causes the exploding mirror to destroy a critical section of itself, thus disrupting the transmission of the "see beam" before it reaches the operator's eye. The problem in making a working embodiment of such a system has been to develop a disruptive element which will disrupt the path of the "see beam" by destroying a critical section of the reflective surface in a period of 25 nanoseconds or less when struck by a laser beam of focused energy density of 10 J/cm.$^2$ or greater.

Prior attempts to design disruptive elements to meet the system requirements have been proposed by D. Hartter in FEASIBILITY OF EXPLOSIVE MIRRORS FOR THE LASER BEAM DISRUPTER (Conf.) 25 Jan. 65, HDL Report R910—65—C1 and by D. Hartter, J. Boyd and Z. Sztankay, in LASER INITIATION OF THIN EXPLOSIVE WAFERS (U) 1968 (Conf.), HDL Technical Report TR-1386. In the first report, Hartter proposes an explosive film adjacent to a thin-film mirror and in the second report the authors disclose a pressed wafer of explosive material adjacent to a thin-film mirror and confined by series of thin plastic films. During the development of the explosive film system, experimentation showed that a high density of the explosive was necessary in order to realize the fast initiation times which were required. The exploding film mirrors were found not to have the required density and were therefore unsatisfactory for the required system. While the design using a pressed wafer of explosive material with laminate structure did have the desired density, there was a problem of improper matching of layer thickness to charge thickness after constructing the confinement volume with the layered plastic films. Another problem in constructing the latter device was cutting holes in the laminates to the exact profile of the thin explosive wafer used.

It is therefore an object of this invention to provide a disruptive element to be used in an optical sighting device which will disrupt the sight path in a given period of time after being impinged upon by a laser beam of sufficient energy density.

An additional object of the invention is to provide a disruptive element for an optical viewing device which will protect the eyesight of an observer using the viewing device from the harmful effects of laser radiation.

Still an additional object of the invention is to provide a method of making an exploding mirror for an optical viewing system which will operate within the designed criteria needed by the system in order to protect against the harmful effects of laser radiation.

SUMMARY OF THE INVENTION

The aforementioned objects of our invention are achieved by a thin-film mirror deposited on a glass slide with an explosive wafer placed adjacent to the thin-film mirror at a point corresponding to the area of the mirror upon which the optical sight-path is focused. The explosive wafer and thin-film mirror are tightly encapsulated in a clear epoxy. The exploding mirror is constructed by placing the glass slide with the thin-film mirror in a mold, positioning the explosive wafer over the mirror and filling the mold with epoxy. After removal from the mold the exterior surface of the epoxy is polished for transparency.

BRIEF DESCRIPTION OF THE DRAWINGS

The specific nature of the invention as well as other objects, aspects, uses, and advantages thereof will clearly appear from the following description and from the accompanying drawing, in which.

DESCRIPTION OF THE PREFERRED EMBODIMENT

Figure 1:
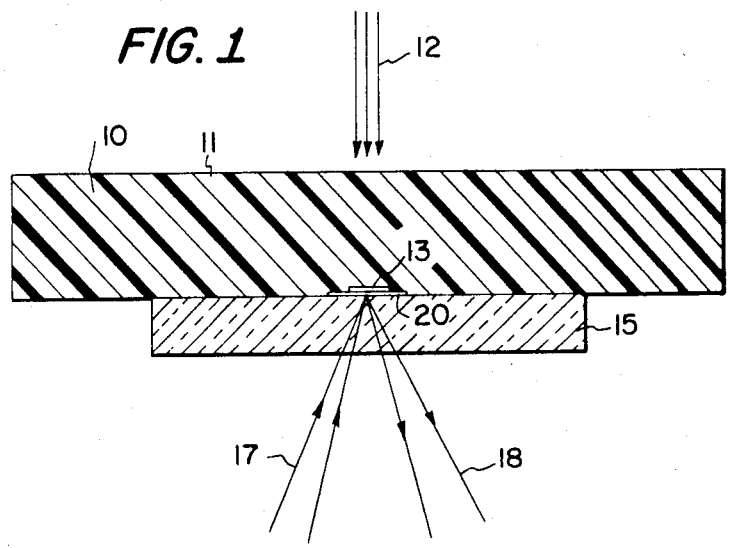
FIG. 1 illustrates the exploding mirror in accordance with our invention.

FIG. 1 illustrates an exploding mirror having a clear epoxy covering 10 encapsulating a glass slide 15 with a thin-film mirror 20 deposited thereon. An explosive charge 13 is situated in between the thin-film mirror 20 and the epoxy covering 10 directly adjacent to the center of the thin-film mirrored surface 20. The epoxy covering 10 is 30 to 50 mils thick and its top surface 11 is buffed flat so as to present a transparent surface to a laser beam approaching along path 12. The glass slide 15 is approximately 6 mils thick and is also transparent to a light beam which approaches along path 17 and is reflected from the mirror 20 along path 18.

During operation of an optical viewing system utilizing the exploding mirror of FIG. 1, such as the copending application previously referred to, the light entering the viewing system will directly approach the exploding mirror as a "burn beam" along the light path 12 and a delayed beam or "see beam" in the optical sight path will approach along the path 17 to be reflected by mirror 20 along path 18. The mirror 20 will be reflective as long as the "burn beam" entering along path 12 does not detonate the exploding charge 13. If the energy density of the incoming light to the viewing system becomes excessive, i.e. a laser beam is encountered of sufficient energy density, the "burn beam" will cause the explosive charge 13 to detonate and the ensuing explosion will destroy the thin-film mirror 20 and part of the glass slide 15, thereby disrupting the optical sight path 17 and 18. This will interrupt the "see beam" and prevent any excessive laser energy from reaching the eye of an observer.

Figure 2A:
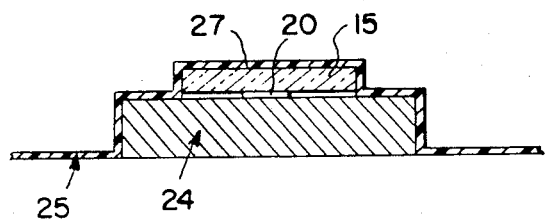
FIGS. 2a, 2b, and 2c illustrate the method used to make an exploding mirror in accordance with our invention.
Figure 2B:
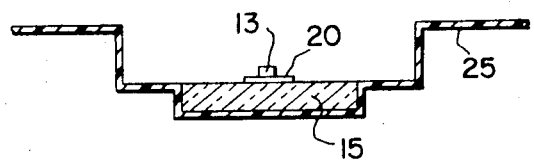
Figure 2C:
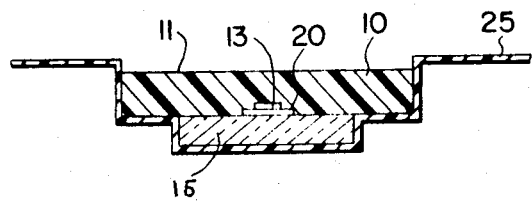

FIGS. 2a, 2b, and 2c illustrate the method used to construct the exploding mirror shown in FIG. 1. In FIG. 2a, a mold 25 is fabricated from polystyrene by a well-known vacuum thermo-form process over a rectangular steel block 24 on which is positioned the glass slide 15 having the mirror 20 deposited thereon. The glass slide 15 is oriented so that the mirrored surface 20 is between the slide 15 and the steel block 24. The upper surface 27 of the glass slide 15 is coated with silicone grease (not shown) before the thermo-form process to allow easy removal of the completed mirror from the mold 25. After shaping the polystyrene, the steel block 24 is removed and the mold 25 is ready for placement of the explosive charge.

In FIG. 2b, a small amount of silicone oil (not shown) is centrally placed on the mirrored surface 20 and the charge 13 is set snugly into the oil in the center of the thin-film mirrored surface 20. Epoxy 10 is then poured over the explosive charge 13, the mirror 20, and the glass slide 15 so as to fill the hollow space in the mold 25 as shown in FIG. 2c. The silicone oil is used to prevent the epoxy 10 from seeping between the mirror 20 and charge 13. Such seepage might hinder destruction of the mirror 20 after detonation of the explosive charge 13. When the epoxy 10 is fully cured the exploding mirror assembly is removed from the mold 25, and the upper surface of the epoxy 11 can then be ground flat on fine emery and buffed clear to a windowlike appearance. The exploding mirror is now ready for operation as described above.

Tests were run on exploding mirrors constructed in accordance with the foregoing method at the Harry Diamond Laboratories in Washington, D.C. The experiments performed recorded delay times ranging between 20 and 30 nanoseconds for an incident igniting beam of 10 J/cm$^2$ energy density. It is apparent that these results are well within the stipulated requirements for an optical viewing system as described.

It will be apparent that the embodiments shown are only exemplary and that various modifications can be made in construction and arrangement within the scope of the invention as defined in the appended claims.

We claim:

1. An exploding mirror for an optical viewing system incorporating a laser beam comprising:
   a. a first light path;
   b. a second light path;
   c. reflecting means to reflect light transmitted by said second light path and not by said first light path; and
   d. explosive charge disrupter means responsive to the direct impingement of light thereon to destroy said reflecting means in response to light transmitted by said first light path.

2. The exploding mirror of claim 1 wherein said exploding charge is positioned adjacent to said reflecting means.

3. The exploding mirror of claim 2 wherein said reflecting means is a thin-film mirror deposited on glass.

4. The exploding mirror of claim 3 wherein said explosive charge and said thin-film mirror are encapsulated in epoxy, the light transmitted by said first light path passing through the epoxy before impinging upon said explosive charge.